United States Patent
Wang et al.

(10) Patent No.: US 11,256,369 B2
(45) Date of Patent: Feb. 22, 2022

(54) METHOD, DEVICE, AND STORAGE MEDIUM FOR PREVENTING FALSE TOUCH OF SCREEN

(71) Applicant: BEIJING XIAOMI MOBILE SOFTWARE CO., LTD., Beijing (CN)

(72) Inventors: Kai Wang, Beijing (CN); Runyu Shi, Beijing (CN); Wei Lu, Beijing (CN); Chenchen Bao, Beijing (CN); Xudong Yin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/000,310

(22) Filed: Aug. 22, 2020

(65) Prior Publication Data

US 2021/0286497 A1 Sep. 16, 2021

(30) Foreign Application Priority Data

Mar. 13, 2020 (CN) .......................... 202010175392.0

(51) Int. Cl.
*G06F 3/041* (2006.01)
*G06F 3/043* (2006.01)
*G06N 3/08* (2006.01)

(52) U.S. Cl.
CPC ........ *G06F 3/04186* (2019.05); *G06F 3/0436* (2013.01); *G06F 3/04166* (2019.05); *G06N 3/08* (2013.01)

(58) Field of Classification Search
CPC ............... G06F 3/04186; G06F 3/0436; G06F 3/04166; G06N 3/08
See application file for complete search history.

(56) References Cited

U.S. PATENT DOCUMENTS

| | | | | |
|---|---|---|---|---|
| 9,823,769 | B2 * | 11/2017 | Geaghan | G06F 3/04164 |
| 10,254,879 | B1 * | 4/2019 | Oral | G06F 3/04883 |
| 10,762,752 | B1 * | 9/2020 | Persson | G08B 6/00 |
| 2010/0214258 | A1 * | 8/2010 | Kuan | G06F 3/0418 |
| | | | | 345/174 |

(Continued)

FOREIGN PATENT DOCUMENTS

| | | |
|---|---|---|
| CN | 108845324 A | 11/2018 |
| EP | 3414598 A2 | 12/2018 |
| GB | 2558768 A | 7/2018 |

OTHER PUBLICATIONS

Extended European Search Report in Application No. 20198749.2, dated Mar. 23, 2021.

*Primary Examiner* — Ibrahim A Khan
(74) *Attorney, Agent, or Firm* — Syncoda LLC; Feng Ma

(57) ABSTRACT

A method for preventing a false touch of a screen includes: sending a bandpass ultrasonic signal; receiving a reflected ultrasonic signal; calculating frequency domain information of the reflected ultrasonic signal; calculating at least one ultrasonic feature vector according to the frequency domain information, the ultrasonic feature vector being used to characterize movement state information of the mobile terminal approaching or moving away from an obstacle; constructing a feature vector set comprising the at least one ultrasonic feature vector; determining whether a condition for preventing a false touch is met according to the feature vector set; disabling a touch function of the touch screen in a case where the condition for preventing the false touch is met.

16 Claims, 7 Drawing Sheets

(56) References Cited

U.S. PATENT DOCUMENTS

| | | | |
|---|---|---|---|
| 2011/0135114 A1* | 6/2011 | Oba | G09G 3/3406 381/107 |
| 2013/0135235 A1* | 5/2013 | Noutomi | G06F 3/0488 345/173 |
| 2018/0011600 A1* | 1/2018 | Li | G06F 3/04886 |
| 2018/0314387 A1* | 11/2018 | Hwang | G06F 3/04186 |
| 2018/0364865 A1* | 12/2018 | Li | G06F 1/1626 |
| 2019/0050061 A1* | 2/2019 | Borstad | G01S 15/523 |
| 2019/0220112 A1* | 7/2019 | Thomas | G01S 15/04 |
| 2020/0064960 A1* | 2/2020 | Munemoto | G06F 3/04883 |
| 2021/0042511 A1* | 2/2021 | Manandhar | G06F 3/017 |

* cited by examiner

METHOD, DEVICE, AND STORAGE MEDIUM FOR PREVENTING FALSE TOUCH OF SCREEN

CROSS-REFERENCE TO RELATED APPLICATIONS

This application claims priority to Chinese Patent Application No. 202010175392.0 filed on Mar. 13, 2020, the disclosure of which is hereby incorporated by reference in its entirety.

BACKGROUND

With the rapid development of communication technologies, mobile terminals have been widely used. User's requirements for the mobile terminals' are also increasing. When a user is using a mobile terminal equipped with a touch screen, the user may control the mobile terminal by touching the touch screen.

SUMMARY

The present disclosure relates to mobile terminal data processing technologies, and more specifically to a method, device, and storage medium for preventing a false touch of screen.

According to a first aspect of an embodiment of the present disclosure, a method for preventing a false touch of a screen is provided, which is applied to a mobile terminal with a touch screen, including:
  sending a bandpass ultrasonic signal;
  receiving a reflected ultrasonic signal;
  calculating frequency
  domain information of the reflected ultrasonic signal;
  calculating at least one ultrasonic feature vector according to the frequency domain information, the ultrasonic feature vector being used to characterize movement state information of the mobile terminal approaching or moving away from an obstacle;
  constructing a feature vector set including the at least one ultrasonic feature vector;
  determining whether a condition for preventing a false touch is met according to the feature vector set;
  disabling a touch function of the touch screen in a case where the condition for preventing the false touch is met.

According to a second aspect of an embodiment of the present disclosure, a device for preventing a false touch of a screen is provided, which is applied to a mobile terminal with a touch screen, including:
  a sending module, configured to send a bandpass ultrasonic signal;
  a receiving module, configured to receive a reflected ultrasonic signal;
  a first calculating module, configured to calculate frequency domain information of the reflected ultrasonic signal;
  a second calculating module, configured to calculate at least one ultrasonic feature vector according to the frequency domain information, the ultrasonic feature vector being used to characterize movement state information of the mobile terminal approaching or moving away from an obstacle;
  a constructing module, configured to construct a feature vector set including the at least one ultrasonic feature vector;
  a determining module, configured to determine whether a condition for preventing a false touch is met according to the feature vector set;
  a processing module, configured to disable a touch function of the touch screen in a case where the condition for preventing the false touch is met.

According to a third aspect of an embodiment of the present disclosure, a device for preventing a false touch of a screen is provided, including: a processor; a memory for storing processor executable instructions; wherein, the processor is configured to execute the executable instructions in the memory to implement the steps of the method described above.

According to a fourth aspect of an embodiment of the present disclosure, a non-transitory computer-readable storage medium is provided, on which executable instructions are stored, and the executable instructions are executed by a processor to implement the steps of the method described above.

It should be understood that the above general description and the following detailed description are only exemplary and explanatory, and do not limit the present disclosure.

BRIEF DESCRIPTION OF THE DRAWINGS

The drawings herein are incorporated into and constitute a part of this disclosure, show embodiments consistent with the present disclosure, and are used to explain principles of some embodiments of the present disclosure together with the specification.

DETAILED DESCRIPTION

Figure 1:
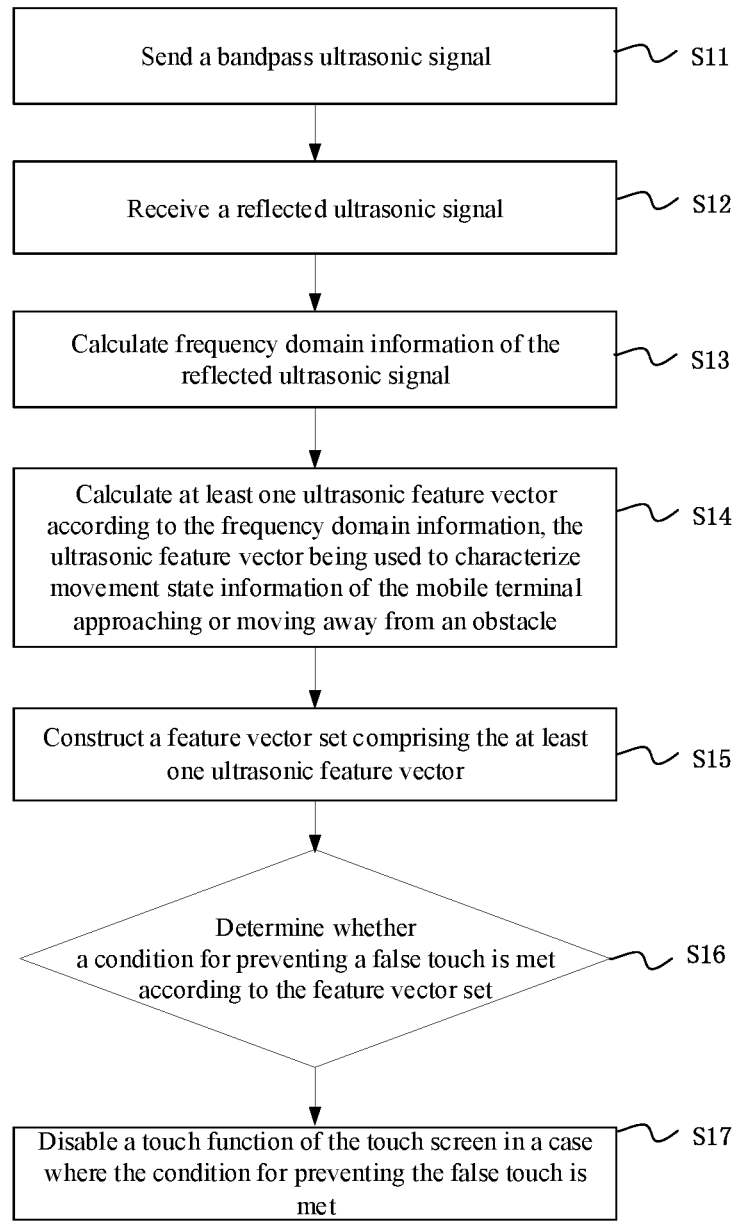
FIG. 1 is a flowchart showing a method for preventing a false touch of a screen according to some embodiments.

Exemplary embodiments will be described in detail here, examples of which are shown in the drawings. When referring to the drawings below, unless otherwise indicated, the same numerals in different drawings represent the same or similar elements. The embodiments described in the following exemplary embodiments do not represent all embodiments consistent with the present disclosure. Rather, they are merely examples of devices and methods consistent with some aspects of the disclosure as detailed in the appended claims.

When a user uses a mobile terminal with a touch screen, in a process of answering a call it is likely to cause a false touch of a call abort button because of the contact between the touch screen and the finger, which will affect a user's call. If the movement of the mobile terminal approaching the face can be detected in time and accurately, a touch function of the touch screen may be disabled in time, thereby preventing a false touch of the call abort button.

Some embodiments of the present disclosure provide a method for preventing a false touch of a screen. The method is applied to a mobile terminal with a touch screen. FIG. 1 is a flowchart of a method for preventing a false touch of a screen according to some embodiments. As shown in FIG. 1, the method includes:

Step S11, sending a bandpass ultrasonic signal.

Step S12, receiving a reflected ultrasonic signal.

Step S13, calculating frequency domain information of the reflected ultrasonic signal.

Step S14, calculating at least one ultrasonic feature vector according to the frequency domain information, the ultrasonic feature vector being used to characterize movement state information of the mobile terminal approaching or moving away from an obstacle.

Step S15, constructing a feature vector set comprising the at least one ultrasonic feature vector.

Step S16, determining whether a condition for preventing a false touch is met according to the feature vector set.

Step S17, disabling a touch function of the touch screen in a case where the condition for preventing the false touch is met.

In Step S11, the sending the bandpass ultrasonic signal, includes: sending the bandpass ultrasonic signal along a side where a touch screen of the mobile terminal is located. For example, a dedicated ultrasonic signal transmitter is used on a front of the mobile terminal (that is, a surface where the touch screen is located) to send the bandpass ultrasonic signal, so that the bandpass ultrasonic signal is sent along the side where the touch screen of the mobile terminal is located. Alternatively, an earpiece of the mobile terminal is generally disposed above the front of the mobile terminal. When the bandpass ultrasonic signal is sent, the earpiece is used as the ultrasound signal transmitter to send the bandpass ultrasonic signal along the side where the touch screen of the mobile terminal is located.

In Step S12, the receiving the reflected ultrasonic signal, includes: receiving the ultrasonic signal from the side where the touch screen of the mobile terminal is located. For example, a dedicated ultrasonic signal receiver is used on the front of the mobile terminal (that is, the surface where the touch screen is located) to receive the ultrasonic signal from the side where the touch screen of the mobile terminal is located. Alternatively, a top microphone of the mobile terminal is generally disposed above the front of the mobile terminal. When the ultrasonic signal is received, when the microphone is used as the ultrasonic signal receiver to receive the ultrasonic signal from the side where the touch screen of the mobile terminal is located.

In some embodiments, at least one ultrasonic feature vector is calculated, which is used to more accurately characterize movement state information of a mobile terminal approaching or away from an obstacle, thereby more accurately learning movement of the mobile terminal, improving accuracy of disabling a touch function of a touch screen, effectively preventing users from a false touch of the touch screen, and particularly, effectively preventing interruption of a call caused by a contact between the touch screen and a face during the call.

Figure 2:
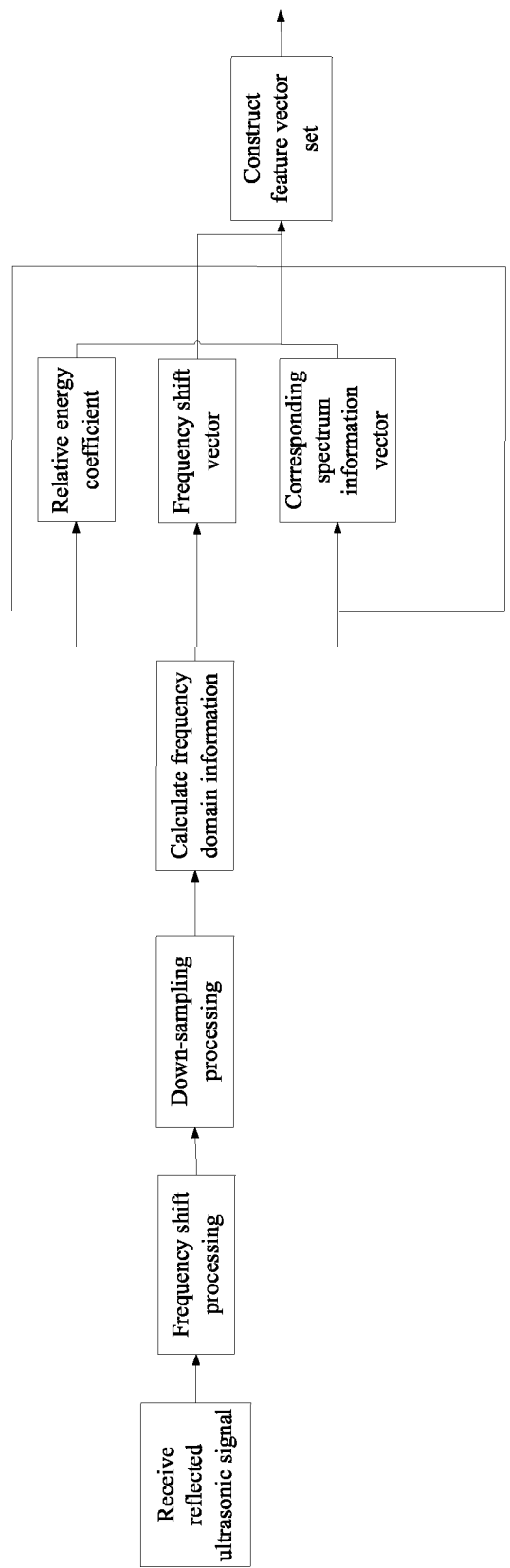
FIG. 2 is a flowchart of Steps S12 to S15 shown in FIG. 1 according to some embodiments.

FIG. 2 is a flowchart of Steps S12 to S15 shown in FIG. 1 according to some embodiments; after receiving the reflected ultrasonic signal in Step S12, frequency shift processing and down-sampling processing are performed on the received reflected ultrasonic signal, and then Step S13 is executed. The at least one ultrasonic feature vector in Step S14 includes at least one of the following: a relative energy coefficient, a frequency shift vector, and a relative spectrum information vector. In Step S15, a feature vector set including the aforementioned ultrasonic feature vector is constructed.

Some embodiments of the present disclosure further provide a method for preventing a false touch of a screen. This method, on the basis of the method shown in FIG. 1, includes: acquiring inertial sensor data of a mobile terminal, and calculating an inertial feature vector according to the inertial sensor data. In Step S15 shown in FIG. 1, the constructing the feature vector set including the at least one ultrasonic feature vector, includes: constructing the feature vector set including the inertial feature vector and the at least one ultrasonic feature vector.

The inertial sensor data is data collected by the inertial sensor in the mobile terminal. Inertial sensors are used to detect and measure movement information such as acceleration, inclination, shock, vibration, and rotation of the mobile terminal. For example, the inertial sensor includes an acceleration sensor and/or an angular velocity sensor. Wherein, the acceleration sensor is used to detect linear movement of the mobile terminal, for example, to detect an inclination angle of a mobile device relative to a horizontal plane; the angular velocity sensor is used to detect angular movement of the mobile terminal, for example, to detect a rotation angle of the mobile device.

Using a combination of the inertial sensor data and the ultrasonic feature vector, compared to a method using only the ultrasonic feature vector, increases representation dimension of movement state information of the mobile terminal, may more accurately characterize the movement state information of the mobile terminal, and improve a recognition accuracy rate of the movement state of the mobile terminal.

Figure 3:
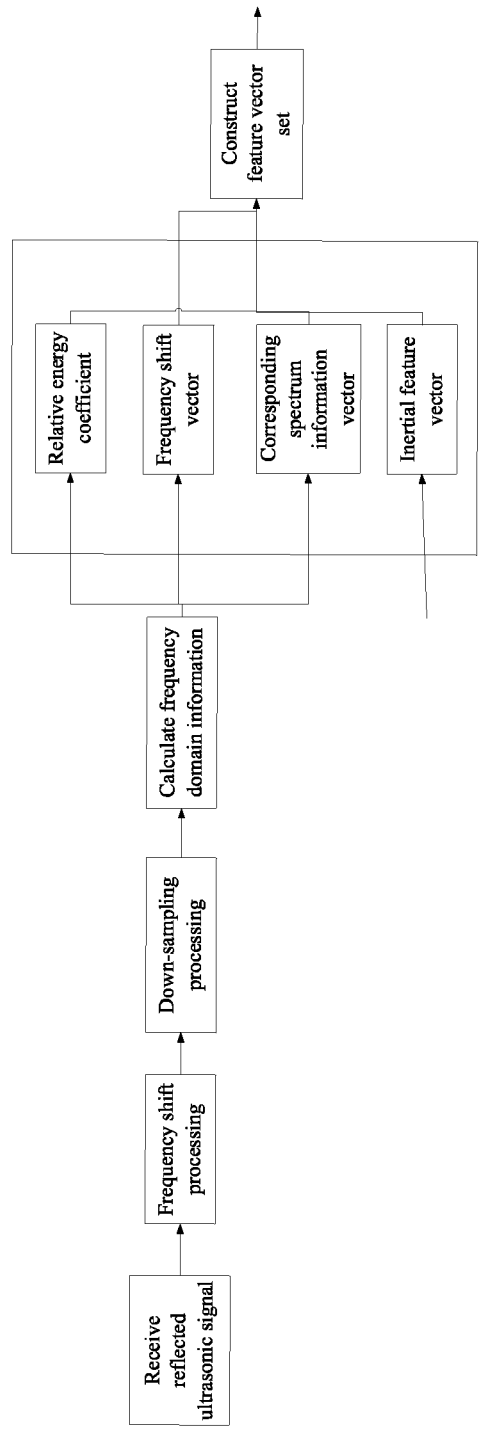
FIG. 3 is a flowchart of Steps S12 to S15 shown in FIG. 1 according to some embodiments.

FIG. 3 is a flowchart of Steps S12 to S15 shown in FIG. 1 according to some embodiments; after the reflected ultrasonic signal is received in Step S12, frequency shift processing and down-sampling processing are performed on the received reflected ultrasonic signal, and then Step S13 is executed. In step S14, the at least one ultrasonic feature vector includes at least one of the following: a relative energy coefficient, a frequency shift vector, and a relative spectrum information vector. In step S15, a feature vector set including the inertial feature vector and the aforementioned ultrasonic feature vector is constructed.

Figure 4:
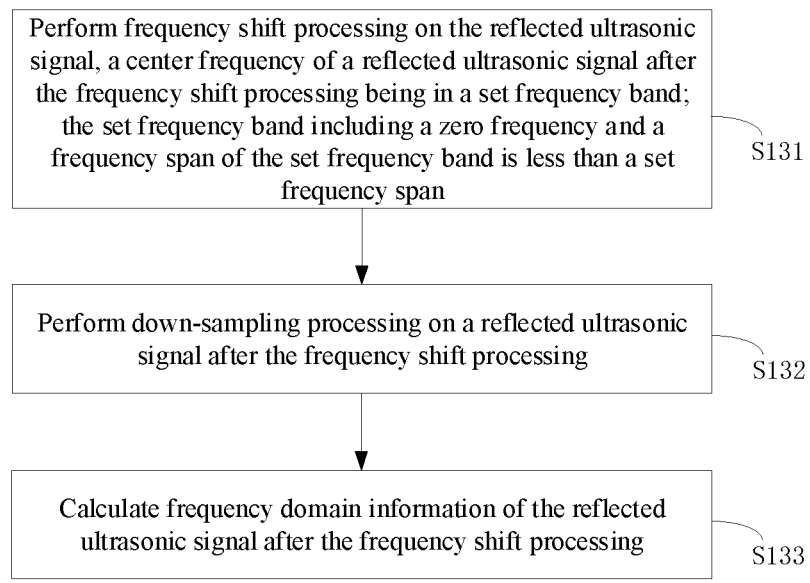
FIG. 4 is a flowchart of Step S13 shown in FIG. 1 according to some embodiments.

Some embodiments of the present disclosure further provide a method for preventing a false touch of a screen. FIG. 4 is a flowchart of Step 13 shown in FIG. 1 according to some embodiments. As shown in FIG. 4, in this method, in Step S13 shown in FIG. 1, the calculating frequency domain information of the reflected ultrasonic signal, includes:

Step S131, performing frequency shift processing on the reflected ultrasonic signal, a center frequency of a reflected ultrasonic signal after the frequency shift processing being in a set frequency band; the set frequency band including a zero frequency and a frequency span of the set frequency band is less than a set frequency span.

Step S132, performing down-sampling processing on a reflected ultrasonic signal after the frequency shift processing.

Step S133, calculating frequency domain information of the reflected ultrasonic signal after the frequency shift processing.

A purpose of performing the frequency shift processing on the reflected ultrasonic signal is to move the center frequency of the reflected ultrasonic signal to near the zero frequency, so as to reduce the amount of data and reduce the amount of calculation after the down-sampling processing.

In some embodiments, frequency shift calculation is performed by using the following Equations 1 and 2 for each frame of the reflected ultrasonic signals:

$$W_{shift}(k) = W(k) * e^{-i x b(k)} \quad \text{Equation 1}$$

$$b(k) = \frac{2\pi(f_0 - f_1)k}{f_s}, \quad k = 0, 1, \ldots, K \quad \text{Equation 2}$$

where, $W_{shift}(k)$ represents the reflected ultrasonic signal after the frequency shift processing, $W(k)$ represents a received reflected ultrasonic signal, $e^{-i \times b(k)}$ is an exponential function with natural constant e as a base and $-i \times b(k)$ as an exponent, $b(k)$ is a phase value of the reflected ultrasonic signal, $f_t$ is a target center frequency after the frequency shift processing (for example, 0 Hz), $f_s$ is a sampling frequency when performing analog-to-digital conversion, and K is the number of discrete data sampled according to the sampling frequency $f_s$ in the ultrasonic data of the current frame.

When programming this frequency shift processing, the exponential function is converted from Euler's formula to a form shown in the following Equation 3 for calculation:

$$e^{-i\theta} = \cos(-\theta) + i^* \sin(-\theta) = \cos\theta - i^* \sin\theta \quad \text{Equation 3:}$$

When a reflected ultrasonic frequency spectrum has been determined, the calculation result of the trigonometric function in the above equation has periodicity, so a trigonometric function value of one period may be stored, and the trigonometric function value corresponding to an ultrasonic phase may be obtained by looking up a table to realize the frequency shift processing.

In some embodiments, the down-sampling processing further includes: using a low-pass filter to filter the reflected ultrasonic signal after the frequency shift processing; the passband of the low-pass filter includes a set frequency band; performing down-sampling processing a filtered ultrasonic signal. Because the reduction of the sampling frequency will cause the compression of the spectrum, it is necessary to use a filtering process to ensure that the spectrum aliasing does not occur at a lower sampling frequency.

Some embodiments of the present disclosure further provide a method for preventing accidental touch of the screen. In this method, in Step S13 shown in FIG. 1, the calculating the frequency domain information of the reflected ultrasonic signal, includes: acquiring discrete data of a reflected ultrasonic signal after an analog-to-digital conversion of the reflected ultrasonic signal, and calculating the frequency domain information by using time-frequency transform algorithms. The time-frequency transform algorithms are Fast Fourier transform (FFT), discrete cosine transform (DCT), etc. For example, when using the FFT, N-point FFT is performed, and the transformed frequency domain information includes N complex numbers, each complex number corresponding to a frequency component. The values of N are 128, 256, 512, 1024, etc.

Before performing frequency domain transformation, windowing processing is also performed to reduce spectrum leakage. Available window functions are black-Harris window, triangular window, Hamming window, etc.

Some embodiments of the present disclosure further provide a method for preventing a false touch of a screen. This method includes the method shown in FIG. 1, wherein the ultrasonic feature vector includes: a relative energy coefficient.

When the ultrasonic feature vector is the relative energy coefficient, in Step S14 shown in FIG. 1, a method for calculating the ultrasonic feature vector according to the frequency domain information includes:

Step 1, calculating energy of a reflected ultrasonic signal according to the frequency domain information of the reflected ultrasonic signal, and calculating the energy of the reflected ultrasonic signal through Parseval's theorem according to energy corresponding to each frequency component.

For example, 256-point FFT calculation is performed on the reflected ultrasonic signal of the current frame to obtain 256 calculation results in the form of complex numbers, and each of the calculation results corresponds to a frequency component. For each frequency component, a square of an amplitude of a corresponding calculation result is calculated to obtain the energy corresponding to the frequency component. The energy of the reflected ultrasonic signal of the current frame is calculated by using the energy corresponding to each frequency component through Parseval's theorem.

Step 2, calculating the relative energy coefficient of the energy of the reflected ultrasonic signal relative to reference energy.

For example, when the relative energy coefficient of the energy of the reflected ultrasonic signal relative to the reference energy is calculated, a ratio of the reference energy to the energy of the reflected ultrasonic signal is calculated, and this ratio is used as the relative energy coefficient.

After the relative energy coefficient is calculated by this method, the relative energy coefficient is normalized, and the relative energy coefficient is normalized into a set interval, for example, the set interval is 0 to 1 interval.

The method further includes: calculating the reference energy. The method for calculating the reference energy specifically includes one of the following:

First, determine a plurality of periods within a first set duration after a false touch prevention function is enabled, calculate the energy of the reflected ultrasonic signal in each of the periods, and use an average of a plurality of calculated energy as the reference energy.

For example, the first set duration is 1 second, and the first set duration is divided into 10 periods, and each of the periods is 0.1 seconds.

Second, determine a plurality of periods within a second set duration after the phone call is connected, calculate the energy of the reflected ultrasonic signal in each of the periods, and use the average of the plurality of energy calculated as the reference energy.

For example, the second set duration is 2 seconds, and the second set duration is divided into 10 periods, and each of which is 0.2 seconds.

Third, collect inertial sensor data, determine a target period, the target period being a period during which a change range of the inertial sensor data is less than a set range after the false touch prevention function is enabled or the phone call is connected, determine a plurality of sub-periods within the target period, calculate the energy of the reflected ultrasonic signal in each of the sub-periods, and use the average or weighted average of the plurality of energy calculated as the reference energy.

In an initial stage after the false touch prevention function is enabled or the phone call is connected, the mobile terminal is generally located away from a user's face, and the energy of the reflected ultrasonic signal received is weak, and as the mobile terminal gradually approaches the user's face, the energy of the reflected ultrasonic signal received will gradually increase. Therefore, when setting the reference energy, the reference energy is calculated by using one period that the false touch prevention function is enabled or the phone call is just connected, and when a subsequent movement of the mobile terminal moving close to the user's face occurs, a process of gradually increasing the energy of the reflected ultrasonic signal is reflected by the relative energy coefficient.

Some embodiments of the present disclosure further provide a method for preventing a false touch of the screen. This method includes the method shown in FIG. 1, wherein an ultrasonic feature vector includes a frequency shift vector, and the frequency shift vector includes a high-frequency frequency shift vector and/or a low-frequency frequency shift vector.

The high-frequency frequency shift vector is used to indicate a frequency shift in a frequency band, in which the frequency is greater than a highest frequency in a spectrum of the reflected ultrasonic signal and a frequency interval from the highest frequency is less than a set frequency interval; the low-frequency frequency shift vector is used to indicate a frequency shift in a frequency band, in which the frequency is smaller than a lowest frequency in the spectrum of the reflected ultrasonic signal and a frequency interval from the lowest frequency is less than the set frequency interval.

When the ultrasonic feature vector is the frequency shift vector, in Step S14 shown in FIG. 1, the method for calculating the ultrasonic feature vector according to the frequency domain information, includes:

determining a bandpass upper cutoff frequency of the bandpass ultrasonic signal, determining a first frequency in the frequency domain information corresponding to the bandpass upper cutoff frequency, determining a plurality of second frequencies greater than the first frequency, determining energy corresponding to each of the second frequencies according to the frequency domain information, and using a sum, average or weighted average of energy corresponding to each of the second frequencies as a value of the high-frequency frequency shift vector; and/or;

determining a bandpass lower cut-off frequency of the bandpass ultrasonic signal, determining a third frequency in the frequency domain information corresponding to the bandpass lower cut-off frequency, determining a plurality of fourth frequencies less than the third frequency, determining energy corresponding to each of the fourth frequencies according to the frequency domain information, and using a sum, average or weighted average of energy corresponding to each of the fourth frequencies as a value of the low-frequency frequency shift vector.

When determining the plurality of second frequencies greater than the first frequency, in order to prevent the second frequency from being too far away from the first frequency, a difference between the second frequency and the first frequency is defined to be less than a set frequency difference, for example, the set frequency difference is 1 kHz. When determining the plurality of fourth frequencies less than the third frequency, in order to prevent the fourth frequency from being too far away from the third frequency, a difference between the fourth frequency and the third frequency is defined to be less than a set frequency difference.

During the movement of the mobile terminal approaching to the user's face, the frequency spectrum of the reflected ultrasonic signal generates a frequency shift and moves toward a high frequency direction, so that a value of the high-frequency frequency shift vector increases. The faster the mobile terminal approaches to the user's face, the greater the frequency shift of the spectrum of the reflected ultrasonic signal in the high frequency direction is, and the faster the value of the high-frequency frequency shift vector increases. During the movement of the mobile terminal moving away from the user's face, the frequency spectrum of the reflected ultrasonic signal generates the frequency shift and moves toward a low frequency direction, so that a value of the low-frequency frequency shift vector increases. The faster the mobile terminal moves away from the user's face, the greater the frequency shift of the spectrum of the reflected ultrasonic signal in the low frequency direction is, and the faster the value of the low-frequency frequency shift vector increases.

After receiving the reflected ultrasonic signal, without performing the frequency shift processing and down-sampling processing on the reflected ultrasonic signal making the center frequency close to zero frequency, it is determined that the first frequency in the frequency domain information of the reflected ultrasonic signal corresponding to the bandpass upper cut-off frequency is equal to the bandpass upper cut-off frequency. It is determined that the third frequency in the frequency domain information of the reflected ultrasonic signal corresponds to the lower bandpass cut-off frequency is equal to this bandpass cut-off frequency. Examples are as follows:

A passband frequency band of a transmitted bandpass ultrasonic signal is 25-30 kHz, and a center frequency is 27.5 kHz. A reflected ultrasonic analog signal is received, analog-to-digital conversion is performed, and a reflected ultrasonic discrete signal is obtained. If a sampling frequency when performing the analog-to-digital conversion is 96 kHz, and thus a time-frequency conversion is performed on the discrete signal, a frequency band covered by the corresponding frequency domain signal is 0-48 kHz. Without performing the frequency shift processing and down-sampling processing on the reflected ultrasonic discrete signal, it is determined that: the first frequency is 30 kHz, the plurality of second frequencies are 30.05 kHz, 30.1 kHz, 30.15 kHz, 30.2 kHz, 30.25 kHz, respectively, the third frequency is 25 kHz, and the plurality of fourth frequencies are 24.75 kHz, 24.8 kHz, 24.85 kHz, 24.9 kHz, and 24.95 kHz, respectively.

After receiving the reflected ultrasonic signal, without performing the frequency shift processing and down-sampling processing on the reflected ultrasonic signal making the center frequency close to zero frequency, it is determined that a value of the first frequency in the frequency domain information after the frequency shift processing corresponding to the bandpass upper cut-off frequency is (fh−fl)/2, wherein, fh is a bandpass upper cut-off frequency of the transmitted bandpass ultrasonic signal, and fl is a bandpass lower cut-off frequency of the transmitted band-pass ultrasonic signal. It is determined that a value of the third frequency corresponding to the bandpass lower cut-off frequency in the frequency domain information after the frequency shift processing is (fl−fh)/2. Examples are as follows:

The passband frequency band of the transmitted bandpass ultrasonic signal is 25-30 kHz, and the center frequency is 27.5 kHz. The reflected ultrasonic analog signal is received, the analog-to-digital conversion is performed, and the reflected ultrasonic discrete signal is obtained. If the sampling frequency when performing the analog-to-digital conversion is 96 kHz, and thus after the time-frequency conversion is performed on the discrete signal, a frequency band covered by the frequency domain signal is 0-48 kHz (for actual signal processing, only a positive frequency portion is considered for the frequency domain information). The frequency shift processing making the center frequency close to zero frequency is performed on the reflected ultrasonic discrete signal, and the corresponding frequency band after the frequency shift processing is in a range of −2.5 kHz to 2.5 kHz. It is determined that the first frequency is 2.5 kHz and the second frequency is −2.5 kHz. The down-sampling process is performed. The sampling frequency during the down-sampling process is 6 kHz, and the frequency band covered by the frequency domain signal after the down-sampling processing is −3 kHz to 3 kHz. It is determined that: the first frequency is 2.5 kHz, the plurality of second frequencies are 2.51 kHz, 2.52 kHz, 2.53 kHz, 2.54 kHz, 2.55 kHz, respectively, the third frequency is −2.5 kHz, and the plurality of fourth frequencies are −2.45 kHz, −2.46 kHz, −2.47 kHz, −2.48 kHz, −2.49 kHz, respectively.

Some embodiments of the present disclosure further provide a method for preventing a false touch of a screen. This method includes the Steps shown in FIG. 1, in Step S11, the sending the bandpass ultrasonic signal, includes: simultaneously sending a plurality of bandpass ultrasonic signals, passband frequency bands of the plurality of bandpass ultrasonic signals being different from each other. The passband frequency bands of the plurality of bandpass ultrasonic signals are connected in sequence, or the passband frequency bands of some of the bandpass ultrasonic signals partially overlap.

For example, the mobile terminal simultaneously sends four bandpass ultrasonic signals, and the corresponding passband frequency bands are 20 kHz to 25 kHz, 25 kHz to 30 kHz, 30 kHz to 35 kHz, and 35 kHz to 40 kHz, respectively. The four bandpass ultrasonic signals are superimposed as a combined bandpass ultrasonic signal, and a passband frequency band of the combined bandpass ultrasonic signal is 20 kHz to 40 kHz.

For example, the mobile terminal simultaneously sends four bandpass ultrasonic signals, and the corresponding passband frequency bands are 20 kHz to 28 kHz, 25 kHz to 33 kHz, 30 kHz to 38 kHz, and 35 kHz to 40 kHz, respectively. The four bandpass ultrasonic signals are superimposed as a combined bandpass ultrasonic signal, and the passband frequency band of the combined bandpass ultrasonic signal is 20 kHz to 40 kHz.

For example, the mobile terminal simultaneously sends three bandpass ultrasonic signals, and the corresponding passband frequency bands are 20 kHz to 25 kHz, 26 kHz to 32 kHz, and 35 kHz to 40 kHz, respectively. The three bandpass ultrasonic signals are superimposed as a combined band-pass ultrasonic signal, and a passband frequency band of the combined bandpass ultrasonic signal is the superposition of three frequency bands, that is, including these three frequency intervals: 20 kHz to 25 kHz, 26 kHz to 32 kHz, 35 kHz to 40 kHz.

The ultrasonic feature vector in this method is relative spectrum information.

When the ultrasonic feature vector is the relative spectrum information, in Step S14 shown in FIG. 1, the calculating the ultrasonic feature vector according to the frequency domain information, includes: calculating energy of each of the of the bandpass ultrasonic signals, using maximum energy among the energy of the plurality of bandpass ultrasonic signals as a reference value, determining a reference coefficient corresponding to the reference value, calculating a relative coefficient of the energy of each of the bandpass ultrasonic signals except a bandpass ultrasonic signal having the maximum energy and the reference value, and constructing a relative spectrum sequence including the reference coefficient and the relative coefficient according to ascending order or descending order of the passband frequency bands of the plurality of bandpass ultrasonic signals.

After the relative spectrum sequence is obtained, the relative spectrum sequence may also be normalized, for example: normalized to an interval of 0 to 1.

Due to an interference phenomenon, when the mobile terminal approaches to an obstacle and moves away from the obstacle, the relative spectrum sequence will show different fringe states, so that the relative spectrum sequence may be used to describe the different movement states of the terminal approaching to the obstacle and moving away from the obstacle.

Some embodiments of the present disclosure further provide a method for preventing a false touch of a screen. This method includes the method shown in FIG. 1 and before Step S11, further includes: using three sets of training data to perform training on a deep learning model until the training is successful, each set of the training data including a target value and corresponding sample data; different target values represent different movement states of the mobile terminal, and the movement state includes: a movement state where a movement direction is close to the obstacle, a movement state where a movement direction is away from the obstacle, and a non-movement state; the sample data includes a sample feature vector set.

This deep learning model may be a neural network, a classifier, etc., such as a two-layer recurrent neural network.

In Step S16 shown in FIG. 1, the determining whether the condition for preventing the false touch is met according to the feature vector set, includes: inputting the feature vector set into a successfully trained deep learning model, and determining the movement state of the mobile terminal according to an output value of the successfully trained deep learning model; determining whether the condition for preventing the false touch is met according to the movement state of the mobile terminal.

The determining whether the condition for preventing the false touch is met according to the movement state of the mobile terminal, includes one of the following:

first, determining that the condition for preventing the false touch is met, in a case where the movement state of the mobile terminal is the movement state where the movement direction is close to the obstacle;

second, recording a duration that the mobile terminal maintains the movement direction, if the movement state of the mobile terminal is the movement state where the movement direction is close to the obstacle, and determining that the condition for preventing the false touch, in a case where the duration is greater than a third set duration;

third, calculating a distance between the mobile terminal and the obstacle, in a case where the movement state of the mobile terminal is the movement state where the movement direction is close to the obstacle, and determining that the condition for preventing the false touch, in a case where the distance between the mobile terminal and the obstacle is less than a set distance.

For example, when sending the bandpass ultrasonic signals in 27 different frequency bands in Step S11 shown in FIG. 1, the ultrasonic feature vector includes: a 1-dimensional relative energy coefficient, a 1-dimensional high-frequency frequency shift vector, a 1-dimensional low-frequency frequency shift vector, and a 27-dimensional relative spectral sequence; the inertial feature vector includes a 3-dimensional acceleration change rate and a 3-dimensional angular velocity change rate. The ultrasonic feature vector and the inertial feature vector are combined into a 36-dimensional feature vector set.

When using the deep learning model for training and recognition, the ultrasonic feature vectors have been normalized, and the deep learning model may be directly inputted. When the ultrasonic feature vector is not normalized, the ultrasonic feature vector is normalized to a same normalized interval, and then inputting is performed.

Figure 5:
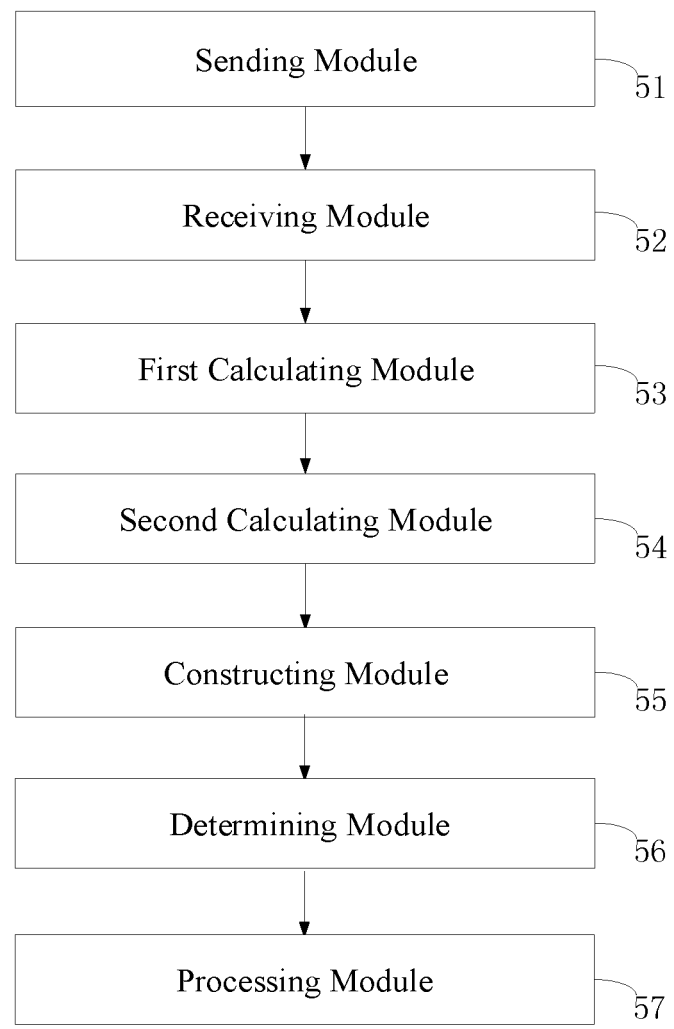
FIG. 5 is a structural diagram of a device for preventing a false touch of a screen according to some embodiments.

Some embodiments of the present disclosure further provide a device for preventing a false touch of a screen, which is applied to a mobile terminal with a touch screen. FIG. 5 is a structural diagram of a device for preventing a false touch of a screen according to some embodiments. As shown in FIG. 5, the device includes:

a sending module 51, configured to send a bandpass ultrasonic signal;

a receiving module 52, configured to receive a reflected ultrasonic signal;

a first calculating module 53, configured to calculate frequency domain information of the reflected ultrasonic signal;

a second calculating module 54, configured to calculate at least one ultrasonic feature vector according to the frequency domain information, the ultrasonic feature vector being used to characterize movement state information of the mobile terminal approaching or moving away from an obstacle;

a constructing module 55, configured to construct a feature vector set including the at least one ultrasonic feature vector;

a determining module 56, configured to determine whether a condition for preventing a false touch is met according to the feature vector set;

a processing module 57, configured to disable a touch function of the touch screen in a case where the condition for preventing the false touch is met.

Some embodiments of the present disclosure further provide a device for preventing a false touch of a screen, the device includes the modules shown in FIG. 5, and further includes: an acquiring module, configured to acquire inertial sensor data of the mobile terminal, and calculate an inertial feature vector according to the inertial sensor data.

The constructing module 55 is further configured to construct a feature vector set including the inertial feature vector and the at least one ultrasonic feature vector.

Figure 6:
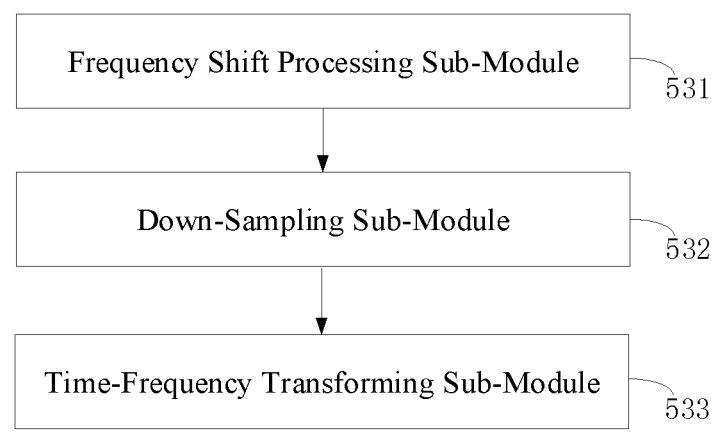
FIG. 6 is a structural diagram of a first calculating module in FIG. 5 according to some embodiments.

Some embodiments of the present disclosure further provide a device for preventing a false touch of a screen. The device includes the modules shown in FIG. 5. FIG. 6 is a structural diagram of the first calculating module 53 shown in FIG. 5 according to some embodiments. As shown in FIG. 6, the first calculating module 53 includes:

a frequency shift processing sub-module 531, configured to perform frequency shift processing on the reflected ultrasonic signal, a center frequency of the reflected ultrasonic signal after the frequency shift processing being in a set frequency band, the set frequency band including a zero frequency and a frequency span of the set frequency band being less than a set frequency span;

a down-sampling sub-module 532, configured to perform down-sampling processing on the reflected ultrasonic signal after the frequency shift processing;

a time-frequency transforming sub-module 533, configured to calculate the frequency domain information of the reflected ultrasonic signal after the frequency shift processing.

Some embodiments of the present disclosure further provide a device for preventing a false touch of a screen. The device includes the modules shown in FIG. 5, and the device further includes: a third calculation module, configured to calculate reference energy.

The at least one ultrasonic feature vector includes: a relative energy coefficient.

The second calculating module 54 is further configured to calculate the at least one ultrasonic feature vector according to the frequency domain information by using a following method: calculating energy of the reflected ultrasonic signal according to the frequency domain information, and calculating a relative energy coefficient of the energy of the reflected ultrasonic signal relative to the reference energy.

In some embodiments, the third calculating module is further configured to calculate the reference energy by using one of the following methods:

determine a plurality of periods within a first set duration after a false touch prevention function is enabled, calculating the energy of the reflected ultrasonic signal in each of the periods, and using a calculated average or weighted average of a plurality of energy as the reference energy;

determining a plurality of periods within a second set duration after a phone call is connected, calculating the energy of the reflected ultrasonic signal in each of the periods, and using the calculated average or weighted average of a plurality of energy as the reference energy;

collecting the inertial sensor data, determine a target period, the target period being a period during which the false touch prevention function is enabled or a change range of the inertial sensor data after the phone call is connected is less than a set range, determining a plurality of sub-periods within the target period, calculating the energy of the reflected ultrasonic signal in each of the sub-periods, and using the calculated average or weighted average of the plurality of energy as the reference energy.

Some embodiments of the present disclosure further provide a device for preventing a false touch of a screen. The device includes the modules shown in FIG. 5.

When applying the device, the at least one ultrasonic feature vector includes: a frequency shift vector; the frequency shift vector includes a high-frequency frequency shift vector and/or a low-frequency frequency shift vector.

The second calculating module in the device is further configured to calculate the at least one ultrasonic feature vector according to the frequency domain information by using a following method:

determining a bandpass upper cutoff frequency of the bandpass ultrasonic signal, determine a first frequency in the frequency domain information corresponding to the bandpass upper cutoff frequency, determining a plurality of second frequencies greater than the first frequency, determining energy corresponding to each of the second frequencies according to the frequency domain information, and using a sum, average or weighted average of energy corresponding to each of the second frequencies as a value of the high-frequency frequency shift vector and/or;

determining a bandpass lower cut-off frequency of the bandpass ultrasonic signal, determining a third frequency in the frequency domain information corresponding to the bandpass lower cut-off frequency, determining a plurality of fourth frequencies less than the third frequency, determining energy corresponding to each of the fourth frequencies according to the frequency domain information, and using a sum, average or weighted average of energy corresponding to each of the fourth frequencies as a value of the low-frequency frequency shift vector.

Some embodiments of the present disclosure further provide a device for preventing a false touch of a screen. The device includes the modules shown in FIG. 5. The sending module in the device is further configured to simultaneously send a plurality of bandpass ultrasonic signals, passband frequency bands of the plurality of bandpass ultrasonic signals being different from each other.

When applying this device, the at least one ultrasonic feature vector includes: a relative spectrum sequence.

The second calculating module is further configured to calculate the at least one ultrasonic feature vector according to the frequency domain information by using a following method:

calculate the energy of each of the bandpass ultrasonic signals, use maximum energy in the energy of the plurality of bandpass ultrasonic signals as a reference value, determine a reference coefficient corresponding to the reference value, calculate a relative coefficient of the energy of each of the bandpass ultrasonic signals except a bandpass ultrasonic signal having the maximum energy and the reference value, and construct a relative spectrum sequence including the reference coefficient and the relative coefficient according to ascending order or descending order of the passband frequency bands of the plurality of bandpass ultrasonic signals.

Some embodiments of the present disclosure further provide a device for preventing a false touch of a screen. The device includes the modules shown in FIG. 5. The device further includes:

a training module, configured to use three sets of training data to perform training on a deep learning model until the training is successful, each set of the training data including a target value and corresponding sample data; different target values represent different movement states of the mobile terminal, and the movement state includes: a movement state where a movement direction is close to the obstacle, a movement state where a movement direction is away from the obstacle, and a non-movement state; the sample data includes a sample feature vector set;

the determining module 56 is further configured to determine whether the condition for preventing the false touch is met according to the feature vector set by using a following method: inputting the feature vector set into a successfully trained deep learning model, and determining the movement state of the mobile terminal according to an output value of the successfully trained deep learning model; determining whether the condition for preventing the false touch is met according to the movement state of the mobile terminal.

In some embodiments, the determining whether the condition for preventing the false touch is met according to the movement state of the mobile terminal, includes one of the following:

determining that the condition for preventing the false touch is met, in a case where the movement state of the mobile terminal is the movement state where the movement direction is close to the obstacle;

recording a duration that the mobile terminal maintains the movement direction, in a case where the movement state of the mobile terminal is the movement state where the movement direction is close to the obstacle, and determining that the condition for preventing the false touch, in a case where the duration is greater than a third set duration;

calculating a distance between the mobile terminal and the obstacle, in a case where the movement state of the mobile terminal is the movement state where the movement direction is close to the obstacle, and determining that the condition for preventing the false touch, if the distance between the mobile terminal and the obstacle is less than a set distance.

Figure 7:
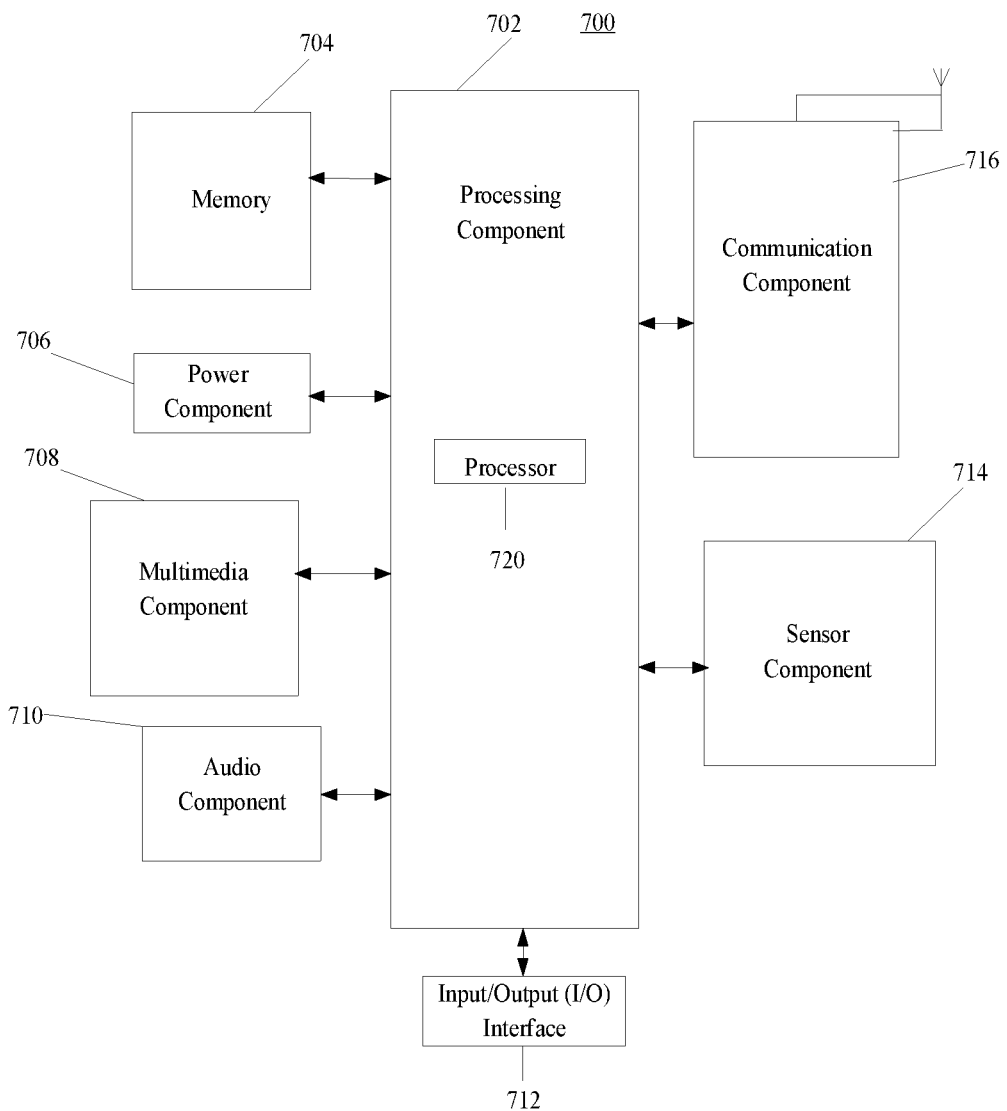
FIG. 7 is a structural diagram of a device for preventing a false touch of a screen according to some embodiments.

FIG. 7 is a block diagram of a device 700 for preventing a false touch of a screen according to some embodiments. For example, the device 700 may be a mobile phone, a computer, a digital broadcasting terminal, a messaging device, a game console, a tablet device, a medical device, a fitness device, a personal digital assistant, and so on.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls the overall operations of the device 700, such as operations associated with display, phone calls, data communications, camera operations, and recording operations. The processing component 702 may include one or more processors 720 to execute instructions to complete all or part of the steps in the above method. In addition, the processing component 702 may include one or more modules to facilitate interaction between the processing component 702 and other components. For example, the processing component 702 may include a multimedia module to facilitate interaction between the multimedia component 708 and the processing component 702.

The memory 704 is configured to store various types of data to support operation at the device 700. Examples of these data include instructions for any application or method operating on the device 700, contact data, phone directory data, messages, pictures, videos, and so on. The memory 704 may be implemented by any type of volatile or non-volatile storage device or a combination thereof, such as a static random access memory (SRAM), an electrically erasable programmable read only memory (EEPROM), an erasable and programmable read only memory (EPROM), a programmable read only memory (PROM), a read only memory (ROM), a magnetic memory, a flash memory, a magnetic disk or an optical disk.

The power component 706 provides power to various components of the device 700. The power components 706 may include a power management system, one or more power sources, and other components associated with generating, managing, and distributing power for the device 700.

The multimedia component 708 includes a screen that provides an output interface between the device 700 and the user. In some embodiments, the screen may include a liquid crystal display (LCD) and a touch panel (TP). In some embodiments, an organic light-emitting diode (OLED) display or other types of displays can be employed.

If the screen includes a touch panel, the screen may be implemented as a touch screen to receive input signals from the user. The touch panel includes one or more touch sensors to sense touch, swipe, and gestures on the touch panel. The touch sensor may not only sense the boundary of the touch or swipe action, but also detect the duration and pressure related to the touch or swipe operation. In some embodiments, the multimedia component 708 includes a front camera and/or a rear camera. When the device 700 is in an operation mode, such as a shooting mode or a video mode, the front camera and/or the rear camera may receive external multimedia data. Each front camera and rear camera may be a fixed optical lens system or have focal length and optical zoom capabilities.

The audio component 710 is configured to output and/or input audio signals. For example, the audio component 710 includes a microphone (MIC), and when the device 700 is in an operation mode, such as a call mode, a recording mode, and a voice recognition mode, the microphone is configured to receive an external audio signal. The received audio signal may be further stored in the memory 704 or sent via the communication component 716. In some embodiments, the audio component 710 further includes a speaker for outputting audio signals.

The I/O interface 712 provides an interface between the processing component 702 and a peripheral interface module. The peripheral interface module may be a keyboard, a click wheel, or a button. These buttons may include, but are not limited to: a home button, a volume button, a start button, and a lock button.

The sensor component 714 includes one or more sensors for providing the device 700 with state assessments in various aspects. For example, the sensor component 714 may detect the on/off state of the device 700, and the relative positioning of the components, for example, the component is a display and keypad of the device 700, and the sensor component 714 may also detect a position change of the device 700 or one component of the device 700, presence or absence of user contact with the device 700, orientation or acceleration/deceleration of the device 700, and the temperature change of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may further include an acceleration sensor, a gyro sensor, a magnetic sensor, a pressure sensor, or a temperature sensor.

The communication component 716 is configured to facilitate wired or wireless communication between the device 700 and other devices. The device 700 may access a wireless network based on a communication standard, such as Wi-Fi, 2G, 3G, 4G, or 5G, or a combination thereof. In some embodiments, the communication component 716 receives a broadcast signal or broadcast related information from an external broadcast management system via a broadcast channel. In some embodiments, the communication component 716 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In some embodiments, the device 700 may be one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, which are used to implement the above method.

In some embodiments, there is also provided a non-transitory computer-readable storage medium including instructions, for example, a memory 704 including instructions, which may be executed by the processor 720 of the device 700 to complete the above method. For example, the non-transitory computer-readable storage medium may be a ROM, a random-access memory (RAM), a CD-ROM, a magnetic tape, a floppy disk, an optical data storage device, or the like.

The instructions, when executed by a processor or processing circuit, can implement the various method steps described above.

For example, in some embodiments, the method steps can further include: acquiring inertial sensor data of the mobile terminal, and calculating an inertial feature vector according to the inertial sensor data;

the constructing the feature vector set including the at least one ultrasonic feature vector, includes:

constructing a feature vector set including the inertial feature vector and the at least one ultrasonic feature vector.

In some embodiments, the calculating the frequency domain information of the reflected ultrasonic signal, includes:

performing frequency shift processing on the reflected ultrasonic signal, a center frequency of the reflected ultrasonic signal after the frequency shift processing being in a set frequency band, the set frequency band including a zero frequency and a frequency span of the set frequency band being less than a set frequency span;

calculating frequency domain information of the reflected ultrasonic signal after the frequency shift processing.

In some embodiments, the calculating the frequency domain information of the reflected ultrasonic signal after the frequency shift processing, includes:

performing down-sampling processing on the reflected ultrasonic signal after the frequency shift processing, and calculating frequency domain information of the reflected ultrasonic signal after the down-sampling processing.

In some embodiments, the method further includes: calculating reference energy;

the at least one ultrasonic feature vector includes: a relative energy coefficient;

the calculating the at least one ultrasonic feature vector according to the frequency domain information, includes:

calculating energy of the reflected ultrasonic signal according to the frequency domain information, and calculating a relative energy coefficient of the energy of the reflected ultrasonic signal relative to the reference energy.

In some embodiments, the calculating the reference energy includes one of the following:

determining a plurality of periods within a first set duration after a false touch prevention function is enabled, calculating the energy of the reflected ultrasonic signal in each of the periods, and using a calculated average or weighted average of a plurality of energy as the reference energy;

determining a plurality of periods within a second set duration after a phone call is connected, calculating the energy of the reflected ultrasonic signal in each of the periods, and using the calculated average or weighted average of a plurality of energy as the reference energy;

collecting the inertial sensor data, determining a target period, the target period being a period during which the false touch prevention function is enabled or a change range of the inertial sensor data after the phone call is connected is less than a set range, determining a plurality of sub-periods within the target period, calculating the energy of the reflected ultrasonic signal in each of the sub-periods, and using the calculated average or weighted average of the plurality of energy as the reference energy.

In some embodiments, the at least one ultrasonic feature vector includes: a frequency shift vector; the frequency shift vector includes a high-frequency frequency shift vector and/or a low-frequency frequency shift vector;

the calculating the at least one ultrasonic feature vector according to the frequency domain information, includes:

determining a bandpass upper cutoff frequency of the bandpass ultrasonic signal, determining a first frequency in the frequency domain information corresponding to the bandpass upper cutoff frequency, determining a plurality of second frequencies greater than the first frequency, determining energy corresponding to each of the second frequencies according to the frequency domain information, and using a sum, average or weighted average of energy corresponding to each of the second frequencies as a value of the high-frequency frequency shift vector;

and/or;

determining a bandpass lower cut-off frequency of the bandpass ultrasonic signal, determining a third frequency in the frequency domain information corresponding to the bandpass lower cut-off frequency, determining a plurality of fourth frequencies less than the third frequency, determining energy corresponding to each of the fourth frequencies according to the frequency domain information, and using a sum, average or weighted average of energy corresponding to each of the fourth frequencies as a value of the low-frequency frequency shift vector.

In some embodiments, the sending the bandpass ultrasonic signal, includes: simultaneously sending a plurality of bandpass ultrasonic signals, passband frequency bands of the plurality of bandpass ultrasonic signals being different from each other;

the at least one ultrasonic feature vector includes: a relative spectrum sequence;

calculating the at least one ultrasonic feature vector according to the frequency domain information, includes:

calculating energy of each of the bandpass ultrasonic signals, using maximum energy among the energy of the plurality of bandpass ultrasonic signals as a reference value, determining a reference coefficient corresponding to the reference value, calculating a relative coefficient of the energy of each of the bandpass ultrasonic signals except a bandpass ultrasonic signal having the maximum energy and the reference value, and constructing a relative spectrum sequence including the reference coefficient and the relative coefficient according to ascending order or descending order of the passband frequency bands of the plurality of bandpass ultrasonic signals.

In some embodiments, the method further includes: using three sets of training data to perform training on a deep learning model until the training is successful, each set of the training data including a target value and corresponding sample data; different target values represent different movement states of the mobile terminal, and the movement state includes: a movement state where a movement direction is close to the obstacle, a movement state where a movement direction is away from the obstacle, and a non-movement state; the sample data includes a sample feature vector set;

the determining whether the condition for preventing the false touch is met according to the feature vector set, includes:

inputting the feature vector set into a successfully trained deep learning model, and determining the movement state of the mobile terminal according to an output value of the successfully trained deep learning model;

determining whether the condition for preventing the false touch is met according to the movement state of the mobile terminal.

In some embodiments, the determining whether the condition for preventing the false touch is met according to the movement state of the mobile terminal, includes one of the following:

determining that the condition for preventing the false touch is met, in a case where the movement state of the mobile terminal is the movement state where the movement direction is close to the obstacle;

recording a duration that the mobile terminal maintains the movement direction, if the movement state of the mobile terminal is the movement state where the movement direction is close to the obstacle, and determining that the condition for preventing the false touch, in a case where the duration is greater than a third set duration;

calculating a distance between the mobile terminal and the obstacle, in a case where the movement state of the mobile terminal is the movement state where the movement direction is close to the obstacle, and determining that the condition for preventing the false touch, in a case where the distance between the mobile terminal and the obstacle is less than a set distance.

In some embodiments, the device further includes: an acquiring module, configured to acquire inertial sensor data of the mobile terminal, and calculate an inertial feature vector according to the inertial sensor data;

the constructing module is further configured to construct a feature vector set including the inertial feature vector and the at least one ultrasonic feature vector.

In some embodiments, the first calculating module includes:

a frequency shift processing sub-module, configured to perform frequency shift processing on the reflected ultrasonic signal, a center frequency of the reflected ultrasonic signal after the frequency shift processing being in a set frequency band, the set frequency band including a zero frequency and a frequency span of the set frequency band being less than a set frequency span;

a time-frequency transforming sub-module, configured to calculate the frequency domain information of the reflected ultrasonic signal after the frequency shift processing.

In some embodiments, the first calculating module further includes: a down-sampling sub-module, configured to perform down-sampling processing on the reflected ultrasonic signal after the frequency shift processing;

the down-sampling sub-module is further configured to calculate frequency domain information of the reflected ultrasonic signal after the down-sampling processing.

In some embodiments, the device further includes: a third calculating module, configured to calculate reference energy;

the at least one ultrasonic feature vector includes: a relative energy coefficient;

the second calculating module is further configured to calculate the at least one ultrasonic feature vector according to the frequency domain information by using a following method: calculating energy of the reflected ultrasonic signal according to the frequency domain information, and calculating a relative energy coefficient of the energy of the reflected ultrasonic signal relative to the reference energy.

In some embodiments, the third calculating module is further configured to calculate the reference energy by using one of the following methods:

determine a plurality of periods within a first set duration after a false touch prevention function is enabled, calculating the energy of the reflected ultrasonic signal in each of the periods, and using a calculated average or weighted average of a plurality of energy as the reference energy;

determining a plurality of periods within a second set duration after a phone call is connected, calculating the energy of the reflected ultrasonic signal in each of the periods, and using the calculated average or weighted average of a plurality of energy as the reference energy;

collecting the inertial sensor data, determine a target period, the target period being a period during which the false touch prevention function is enabled or a change range of the inertial sensor data after the phone call is connected is less than a set range, determining a plurality of sub-periods within the target period, calculating the energy of the reflected ultrasonic signal in each of the sub-periods, and using the calculated average or weighted average of the plurality of energy as the reference energy.

In some embodiments, the at least one ultrasonic feature vector includes: a frequency shift vector; the frequency shift vector includes a high-frequency frequency shift vector and/or a low-frequency frequency shift vector;

the second calculating module is further configured to calculate the at least one ultrasonic feature vector according to the frequency domain information by using a following method:

determining a bandpass upper cutoff frequency of the bandpass ultrasonic signal, determining a first frequency in the frequency domain information corresponding to the bandpass upper cutoff frequency, determining a plurality of second frequencies greater than the first frequency, determining energy corresponding to each of the second frequencies according to the frequency domain information, and using a sum, average or weighted average of energy corresponding to each of the second frequencies as a value of the high-frequency frequency shift vector;

and/or;

determining a bandpass lower cut-off frequency of the bandpass ultrasonic signal, determining a third frequency in the frequency domain information corresponding to the bandpass lower cut-off frequency, determining a plurality of fourth frequencies less than the third frequency, determining energy corresponding to each of the fourth frequencies according to the frequency domain information, and using a sum, average or weighted average of energy corresponding to each of the fourth frequencies as a value of the low-frequency frequency shift vector.

In some embodiments, the sending module is further configured to simultaneously send a plurality of bandpass ultrasonic signals, passband frequency bands of the plurality of bandpass ultrasonic signals being different from each other;

the at least one ultrasonic feature vector includes: a relative spectrum sequence;

the second calculating module is further configured to calculate the at least one ultrasonic feature vector according to the frequency domain information by using a following method:

calculate the energy of each of the bandpass ultrasonic signals, use maximum energy in the energy of the plurality of bandpass ultrasonic signals as a reference value, determine a reference coefficient corresponding to the reference value, calculate a relative coefficient of the energy of each of the bandpass ultrasonic signals except a bandpass ultrasonic signal having the maximum energy and the reference value, and construct a relative spectrum sequence including the reference coefficient and the relative coefficient according to ascending order or descending order of the passband frequency bands of the plurality of bandpass ultrasonic signals.

In some embodiments, the device further includes:

a training module, configured to use three sets of training data to perform training on a deep learning model until the training is successful, each set of the training data including a target value and corresponding sample data; different target values represent different movement states of the mobile terminal, and the movement state includes: a movement state where a movement direction is close to the obstacle, a movement state where a movement direction is away from the obstacle, and a non-movement state; the sample data includes a sample feature vector set;

the determining module is further configured to determine whether the condition for preventing the false touch is met according to the feature vector set by using a following method: inputting the feature vector set into a successfully trained deep learning model, and determining the movement state of the mobile terminal according to an output value of the successfully trained deep learning model; determining whether the condition for preventing the false touch is met according to the movement state of the mobile terminal.

In some embodiments, the determining whether the condition for preventing the false touch is met according to the movement state of the mobile terminal, includes one of the following:

determining that the condition for preventing the false touch is met, in a case where the movement state of the mobile terminal is the movement state where the movement direction is close to the obstacle;

recording a duration that the mobile terminal maintains the movement direction, in a case where the movement state of the mobile terminal is the movement state where the movement direction is close to the obstacle, and determining that the condition for preventing the false touch, in a case where the duration is greater than a third set duration;

calculating a distance between the mobile terminal and the obstacle, in a case where the movement state of the mobile terminal is the movement state where the movement direction is close to the obstacle, and determining that the condition for preventing the false touch, if the distance between the mobile terminal and the obstacle is less than a set distance.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Various embodiments of the present disclosure can include one of more of the following advantages.

At least one ultrasonic feature vector is calculated, which is used to more accurately characterize movement state information of a mobile terminal approaching or away from an obstacle, thereby more accurately learning movement of the mobile terminal, improving accuracy of disabling a touch function of a touch screen, effectively preventing users from a false touch of the touch screen, and particularly, effectively preventing interruption of a call caused by a contact between the touch screen and a face during the call.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for preventing a false touch of a screen, which is applied to a mobile terminal with the touch screen, comprising:
sending a bandpass ultrasonic signal;
receiving a reflected ultrasonic signal;
calculating frequency domain information of the reflected ultrasonic signal;
calculating at least one ultrasonic feature vector according to the frequency domain information, the ultrasonic feature vector being used to characterize movement state information of the mobile terminal approaching or moving away from an obstacle;
constructing a feature vector set comprising the at least one ultrasonic feature vector;
determining whether a condition for preventing a false touch is met according to the feature vector set; and
disabling a touch function of the touch screen in a case where the condition for preventing the false touch is met,
wherein the calculating the frequency domain information of the reflected ultrasonic signal comprises:
performing frequency shift processing on the reflected ultrasonic signal, a center frequency of a reflected ultrasonic signal after the frequency shift processing being in a set frequency band, the set frequency band comprising a zero frequency and a frequency span of the set frequency band being less than a set frequency span; and
calculating frequency domain information of the reflected ultrasonic signal after the frequency shift processing, and
wherein
the calculating the frequency domain information of the reflected ultrasonic signal after the frequency shift processing comprises:
performing down-sampling processing on the reflected ultrasonic signal after the frequency shift processing, and calculating frequency domain information of the reflected ultrasonic signal after the down-sampling processing.

2. The method according to claim 1, wherein
the method further comprises acquiring inertial sensor data of the mobile terminal, and calculating an inertial feature vector according to the inertial sensor data;
the constructing the feature vector set comprising the at least one ultrasonic feature vector comprises:
constructing a feature vector set comprising the inertial feature vector and the at least one ultrasonic feature vector.

3. The method according to claim 1, wherein
the method further comprises: calculating reference energy;
the at least one ultrasonic feature vector comprises: a relative energy coefficient; and
the calculating the at least one ultrasonic feature vector according to the frequency domain information comprises:
calculating energy of the reflected ultrasonic signal according to the frequency domain information, and calculating a relative energy coefficient of the energy of the reflected ultrasonic signal relative to the reference energy.

4. The method according to claim 3, wherein
the calculating the reference energy comprises one of:
determining a plurality of periods within a first set duration after a false touch prevention function is enabled, calculating the energy of the reflected ultrasonic signal in each of the periods, and using a calculated average or weighted average of a plurality of energy as the reference energy;
determining a plurality of periods within a second set duration after a phone call is connected, calculating the energy of the reflected ultrasonic signal in each of the periods, and using a calculated average or weighted average of a plurality of energy as the reference energy; or
collecting inertial sensor data, determining a target period, the target period being a period during which a change range of the inertial sensor data is less than a set range after the false touch prevention function is enabled or the phone call is connected, determining a plurality of sub-periods within the target period, calculating the energy of the reflected ultrasonic signal in each of the sub-periods, and using a calculated average or weighted average of a plurality of energy as the reference energy.

5. The method according to claim 1, wherein
the at least one ultrasonic feature vector comprises: a frequency shift vector; the frequency shift vector comprises at least one of a high-frequency frequency shift vector or a low-frequency frequency shift vector; and
the calculating the at least one ultrasonic feature vector according to the frequency domain information comprises at least one of:
determining a bandpass upper cutoff frequency of the bandpass ultrasonic signal, determining a first frequency in the frequency domain information corresponding to the bandpass upper cutoff frequency, determining a plurality of second frequencies greater than the first frequency, determining energy corresponding to each of the second frequencies according to the frequency domain information, and using a sum, average or weighted average of energy corresponding to each of the second frequencies as a value of the high-frequency frequency shift vector; or
determining a bandpass lower cut-off frequency of the bandpass ultrasonic signal, determining a third frequency in the frequency domain information corresponding to the bandpass lower cut-off frequency, determining a plurality of fourth frequencies less than the third frequency, determining energy corresponding to each of the fourth frequencies according to the frequency domain information, and using a sum, average or weighted average of energy corresponding to each of the fourth frequencies as a value of the low-frequency frequency shift vector.

6. The method according to claim 1, wherein
the sending the bandpass ultrasonic signal comprises:
simultaneously sending a plurality of bandpass ultrasonic signals, passband frequency bands of the plurality of bandpass ultrasonic signals being different from each other;
the at least one ultrasonic feature vector comprises: a relative spectrum sequence; and
calculating the at least one ultrasonic feature vector according to the frequency domain information, comprises:
calculating energy of each of the plurality of bandpass ultrasonic signals, using maximum energy among the energy of the plurality of bandpass ultrasonic signals as a reference value, determining a reference coefficient corresponding to the reference value, calculating a relative coefficient of the energy of each of the plurality of bandpass ultrasonic signals except a bandpass ultrasonic signal having the maximum energy and the reference value, and constructing the relative spectrum sequence comprising the reference coefficient and the relative coefficient according to ascending order or descending order of the passband frequency bands of the plurality of bandpass ultrasonic signals.

7. The method according to claim 1, wherein
the method further comprises: using three sets of training data to perform training on a deep learning model until the training is successful, each set of the training data comprising a target value and corresponding sample data; different target values represent different movement states of the mobile terminal, and the movement state comprises: a movement state where a movement direction is close to the obstacle, a movement state where the movement direction is away from the obstacle, and a non-movement state; the sample data comprises a sample feature vector set; and
the determining whether the condition for preventing the false touch is met according to the feature vector set comprises:
inputting the feature vector set into a successfully trained deep learning model, and determining the movement state of the mobile terminal according to an output value of the successfully trained deep learning model; and
determining whether the condition for preventing the false touch is met according to the movement state of the mobile terminal.

8. The method according to claim 7, wherein
the determining whether the condition for preventing the false touch is met according to the movement state of the mobile terminal comprises one of:
determining that the condition for preventing the false touch is met, in a case where the movement state of the mobile terminal is the movement state where the movement direction is close to the obstacle;
recording a duration that the mobile terminal maintains the movement direction, in a case where the movement state of the mobile terminal is the movement state where the movement direction is close to the obstacle, and determining that the condition for preventing the false touch, in a case where the duration is greater than a third set duration; and
calculating a distance between the mobile terminal and the obstacle, in a case where the movement state of the mobile terminal is the movement state where the movement direction is close to the obstacle, and determining that the condition for preventing the false touch, in a case where the distance between the mobile terminal and the obstacle is less than a set distance.

9. A device for preventing a false touch of a screen, comprising:
a processor; and
memory configured to store processor executable instructions;
wherein the processor is configured to execute the executable instructions in the memory to perform a method applied to the device with the touch screen, and wherein the method comprises:
sending a bandpass ultrasonic signal;
receiving a reflected ultrasonic signal;
calculating frequency domain information of the reflected ultrasonic signal;
calculating at least one ultrasonic feature vector according to the frequency domain information, the ultrasonic feature vector being used to characterize movement state information of the mobile terminal approaching or moving away from an obstacle;
constructing a feature vector set comprising the at least one ultrasonic feature vector;
determining whether a condition for preventing a false touch is met according to the feature vector set; and
disabling a touch function of the touch screen in a case where the condition for preventing the false touch is met,
wherein the calculating the frequency domain information of the reflected ultrasonic signal comprises:
performing frequency shift processing on the reflected ultrasonic signal, a center frequency of a reflected ultrasonic signal after the frequency shift processing being in a set frequency band, the set frequency band comprising a zero frequency and a frequency span of the set frequency band being less than a set frequency span; and
calculating frequency domain information of the reflected ultrasonic signal after the frequency shift processing, and
wherein
the calculating the frequency domain information of the reflected ultrasonic signal after the frequency shift processing comprises:
performing down-sampling processing on the reflected ultrasonic signal after the frequency shift processing, and calculating frequency domain information of the reflected ultrasonic signal after the down-sampling processing.

10. The device according to claim 9, wherein
the method further comprises: acquiring inertial sensor data of the mobile terminal, and calculating an inertial feature vector according to the inertial sensor data;
the constructing the feature vector set comprising the at least one ultrasonic feature vector comprises:
constructing a feature vector set comprising the inertial feature vector and the at least one ultrasonic feature vector.

11. The device according to claim 9, wherein
the method further comprises: calculating reference energy;
the at least one ultrasonic feature vector comprises: a relative energy coefficient; and
the calculating the at least one ultrasonic feature vector according to the frequency domain information comprises:
calculating energy of the reflected ultrasonic signal according to the frequency domain information, and calculating a relative energy coefficient of the energy of the reflected ultrasonic signal relative to the reference energy.

12. The device according to claim 11, wherein
the calculating the reference energy comprises one of:
determining a plurality of periods within a first set duration after a false touch prevention function is enabled, calculating the energy of the reflected ultrasonic signal in each of the periods, and using a calculated average or weighted average of a plurality of energy as the reference energy;
determining a plurality of periods within a second set duration after a phone call is connected, calculating the energy of the reflected ultrasonic signal in each of the periods, and using a calculated average or weighted average of a plurality of energy as the reference energy; or collecting inertial sensor data, determining a target period, the target period being a period during which a change range of the inertial sensor data is less than a set range after the false touch prevention function is enabled or the phone call is connected, determining a plurality of sub-periods within the target period, calculating the energy of the reflected ultrasonic signal in each of the sub-periods, and using a calculated average or weighted average of a plurality of energy as the reference energy.

13. The device according to claim 9, wherein the at least one ultrasonic feature vector comprises: a frequency shift vector;

the frequency shift vector comprises at least one of a high-frequency frequency shift vector or a low-frequency frequency shift vector; and the calculating the at least one ultrasonic feature vector according to the frequency domain information comprises at least one of:

determining a bandpass upper cutoff frequency of the bandpass ultrasonic signal, determining a first frequency in the frequency domain information corresponding to the bandpass upper cutoff frequency, determining a plurality of second frequencies greater than the first frequency, determining energy corresponding to each of the second frequencies according to the frequency domain information, and using a sum, average or weighted average of energy corresponding to each of the second frequencies as a value of the high-frequency frequency shift vector; or determining a bandpass lower cut-off frequency of the bandpass ultrasonic signal, determining a third frequency in the frequency domain information corresponding to the bandpass lower cut-off frequency, determining a plurality of fourth frequencies less than the third frequency, determining energy corresponding to each of the fourth frequencies according to the frequency domain information, and using a sum, average or weighted average of energy corresponding to each of the fourth frequencies as a value of the low-frequency frequency shift vector.

14. The device according to claim 9, wherein the sending the bandpass ultrasonic signal comprises: simultaneously sending a plurality of bandpass ultrasonic signals, passband frequency bands of the plurality of bandpass ultrasonic signals being different from each other;

the at least one ultrasonic feature vector comprises: a relative spectrum sequence; and calculating the at least one ultrasonic feature vector according to the frequency domain information, comprises:

calculating energy of each of the plurality of bandpass ultrasonic signals, using maximum energy among the energy of the plurality of bandpass ultrasonic signals as a reference value, determining a reference coefficient corresponding to the reference value, calculating a relative coefficient of the energy of each of the plurality of bandpass ultrasonic signals except a bandpass ultrasonic signal having the maximum energy and the reference value, and constructing the relative spectrum sequence comprising the reference coefficient and the relative coefficient according to ascending order or descending order of the passband frequency bands of the plurality of bandpass ultrasonic signals.

15. The device according to claim 9, wherein the method further comprises: using three sets of training data to perform training on a deep learning model until the training is successful, each set of the training data comprising a target value and corresponding sample data; different target values represent different movement states of the mobile terminal, and the movement state comprises: a movement state where a movement direction is close to the obstacle, a movement state where the movement direction is away from the obstacle, and a non-movement state; the sample data comprises a sample feature vector set; and the determining whether the condition for preventing the false touch is met according to the feature vector set comprises:

inputting the feature vector set into a successfully trained deep learning model, and determining the movement state of the mobile terminal according to an output value of the successfully trained deep learning model; and determining whether the condition for preventing the false touch is met according to the movement state of the mobile terminal.

16. A mobile terminal implementing the method according to claim 1, wherein the mobile terminal is configured to calculate at least one ultrasonic feature vector to increase accuracy for characterizing movement state information of the mobile terminal approaching or away from the obstacle, thereby more accurately learning movement of the mobile terminal, preventing interruption of a call caused by a contact between the touch screen and a user face during the call.

* * * * *